Figure 1:
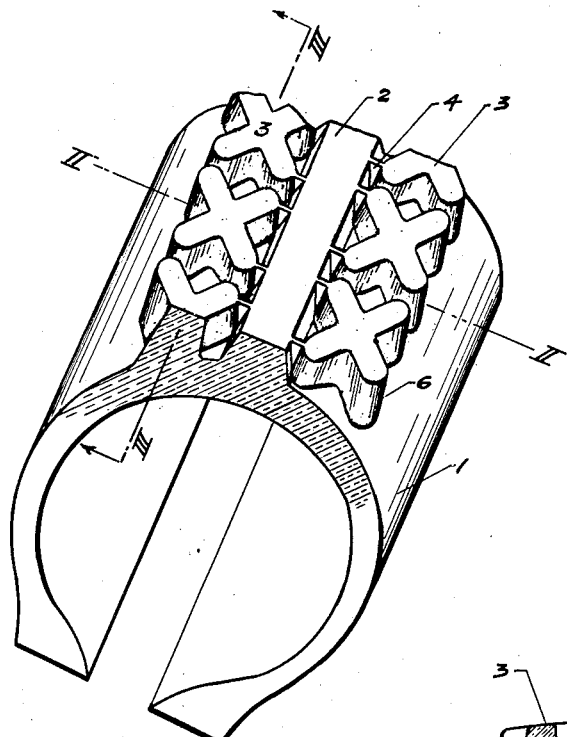

E. G. HULSE.
VEHICLE TIRE.
APPLICATION FILED DEC. 29, 1920.

1,384,759.

Patented July 19, 1921.

INVENTOR
EDISON G. HULSE
BY: *R H Waters*
ATTORNEY.

UNITED STATES PATENT OFFICE.

EDISON G. HULSE, OF CUMBERLAND, MARYLAND, ASSIGNOR TO KELLY-SPRINGFIELD TIRE COMPANY, OF CUMBERLAND, MARYLAND, A CORPORATION OF NEW JERSEY.

VEHICLE-TIRE.

1,384,759.   Specification of Letters Patent.   Patented July 19, 1921.

Application filed December 29, 1920. Serial No. 433,910.

*To all whom it may concern:*

Be it known that I, EDISON G. HULSE, a citizen of the United States, residing at Cumberland, in the county of Allegany and State of Maryland, have invented certain new and useful Improvements in Vehicle-Tires, of which the following is a specification.

My invention relates to improvements in the tread portion of resilient tires, having special reference to those of the pneumatic type, but applicable also to those of the solid class.

Among the principal objects of my invention attention is invited to the following:

To provide a tread strip of the maximum breadth consistent with the preservation of the desired structural balance of the unitary carcass of which the tread is an integral member; to provide in the tread design such transverse contour as will function under load to deflect and effect a uniformly borne stress throughout the breadth of the tread, thereby also to more efficiently distribute the load into the sub-structure of the carcass, and as a further incident thereof to improve the wearing quality of such a structure over that attainable by the conventional type of tire having a tread portion designed with excessive curvature in cross section and absorbing the road contact stresses and friction over a relatively small area.

Another object is to provide in the tread portion properties and characteristics conducive to a high tractive efficiency in direct driving, in combination with geometrical characteristics of the tread configuration adapted to afford the maximum protection against lateral skidding; and to so incorporate the said desirable features in the specific design of the traction elements that the structure, as a whole, will be free of the destructive consequences of overheating, as well as of inherent tendencies to disintegrate and separate under the well known effects of excessive traction wave (being the violent stress set up by the undulation of that portion of the tread immediately in advance of the rolling contact, and especially severe in a tread having peripheral continuity of a considerable cross sectional area). Also to provide a "fast" tread, by maintaining a continuous mid-rib, it being noted that there is a considerable loss in power involved in driving a tire having upstanding projections and without adequate provision for continuity of rolling surface, the action being similar to driving over a slightly transversely rutted road.

To the attainment of these and other useful objects herein appearing this invention consists in the new and useful combination of features more fully hereinafter defined, illustrated in the drawings and specifically claimed.

Figure 2:
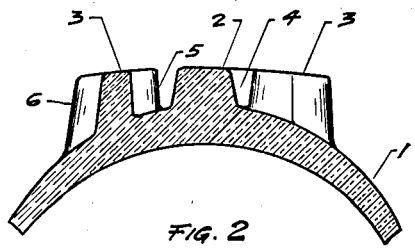
Figure 3:
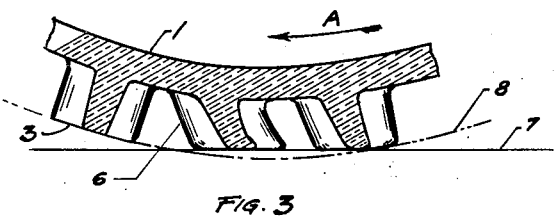

In the accompanying drawing Figure 1 is a fragmentary section, in perspective, of a portion of a tire illustrating in part the features claimed. Fig. 2 is a partial cross sectional view through the plane II—II of Fig. 1 particularly illustrating the relatively flat and wide tread portion and the characteristic features of the preferred mode of dividing the tread surface into a plurality of traction pads. Fig. 3 is a fragmentary section of the structure through the plane III—III of Fig. 1 looking away from the center of the tire and particularly showing the deflection of the deep walled pad-like portions of the tread under the tractive thrust of the tire of a driven wheel when assumed to be rotated in the direction of the arrow A.

Throughout the several figures comprising the drawing similar numerals of reference are employed to denote corresponding parts. Numeral 1 is the tire structure proper, which by way of illustration has been indicated as of the pneumatic type. 2 is a central rib continuous of the periphery. 3 is the preferred type of configuration employed in forming the high-standing figures comprising a portion of the tread strip, the particular function of which is hereinafter more fully set forth. It will be noted that the configuration illustrated as an especially efficient and preferred form has been delineated in the semblance of a cross having a surface curvature peripherally of the tire corresponding with the normal outer circumference thereof, and having in a transverse direction a slightly arched surface; the arms of the cruciform figures are shown as disposed at a preferred angle of 45 degrees to the median plane of the tire structure, the side walls thereof being approximately perpendicular to the normal surface; the dual arrangement of traction pads on either side of the mid-rib presents a staggered arrangement. 4 is a thin, solid web, known as an air-bleeder, vertically disposed and connecting the continuous center rib with the nearest point of approach thereto of a portion of the inner wall of an independent traction pad. 5 is the inner end of the wall of the traction pad at its shallowest point, while 6 is the deepest point of one of said walls, particularly illustrating the construction and proportions of the traction pad design as related to the normal surface curvature of the carcass 1. 7 is the assumed line of the road bed (see Fig. 3). 8 is the assumed and exaggerated outer circumference of the tire structure showing the action of the traction pads at the point of road contact.

It is particularly to be noted that the design of this tire insures a high degree of tractive effort in that the traction pads have been made unusually high. In seeking traction on smooth, wet, or otherwise difficult road surfaces, this tread will function as illustrated in Fig. 3 of the drawing; that is, the independent elements, being relatively resilient and deflectable under tangentially imparted road stresses, will tend to bend and momentarily clutch the road bed, setting up thereby a propulsive force to the vehicle to the power driven wheel of which the tread is attached. As several such tread elements on either side of the mid-rib of the tire are partially, or completely in contact with the road simultaneously it will be appreciated that the aggregate propulsive effect of them will be considerable irrespective of the tractive assistance of the continuously contacting segment of the mid-rib of the tread.

The peculiarly high degree of resiliency found in my traction pads minimizes the wear by abrasion due to their ability to cling to the road without slippage until the wheel has rolled a degree permitting them to lose contact by an abrupt rebound—a shallow and relatively stiff pad tends to slip and grind away, rapidly under similar conditions. In sharp turning, and where a wheel is slightly out of alinement and tending to wabble, the above mentioned characteristics are particularly asserted and of obvious advantage.

In driving on roads capable of being impressed by the tread, great clutching power is asserted by the flaring V-shaped configuration of the angularly disposed arms of the pattern.

The angularly disposed cross arms are especially effective to prevent skidding, in that there are interposed transversely to the path of oblique motion a plurality of these cleat-like members, effective simultaneously on both sides of the mid-rib, and offering, in conjunction with the very considerable effort of the sharply defined edges of that member, an arrangement of surfaces of unusual effect against side slip.

In addition to the above enumerated advantages the geometrical proportions of the pads insure that the beneficial traction properties will be preserved, without diminution, throughout the normal life of the tire.

With regard to the special advantage inherent in providing a relatively wide tread portion having a slight cross sectional curvature (see Fig. 2), it is noted that the purpose of the aforesaid curvature is to insure of the load being uniformly borne by the entire breadth of the tread strip when the arch-like carcass structure is deflected under road contact, wherein the greatest deflection will occur at the center of the arch, assuming its supporting abutments to be the side walls of the tire carcass. As deflection occurs the convex surface of the loaded tread will flatten until the entire structure at the point of load is in a state of equilibrium, the balance of load and support being attained by the internal air pressure common to the utilization of such a tire carcass which has been shown as merely illustrative of the application of my improvements. When a tire is inflated to the proper pressure a uniform unit stress will obtain throughout the entire breadth of the tread portion at the point of load and the shocks incident to use of tires will thus be distributed over a considerable portion of the sub-structure of the carcass, tending to mitigate the danger of rupturing the structure.

From the foregoing it will be appreciated that my invention provides a tire tread portion, combining, in a unitary and economically molded structure, a combination of properties and features not heretofore attained in any other like tread.

Having thus described my invention, what I claim as new therein and desire to secure by Letters Patent is:

1. A tire tread of resilient material, comprising a substantially flat surface in cross section, a continuous annular mid-rib, and resilient counterpart raised and spaced-apart traction pads on each side of said rib, said pads, in plan view, forming cruciform patterns adapted to remain continuously in contact with the road surface throughout their period of traction and to yieldingly clutch the road bed momentarily under the tangentially imparted traction stresses.

2. A tire tread of resilient material, comprising a substantially flat surface in cross section, a continuous annular mid-rib, and counterpart raised and spaced-apart traction pads on each side of said rib, said pads, in plan view, forming cruciform patterns, the breadth of the cross arms being less than the depth thereof, and less than the breadth of the mid rib, said pads being adapted to retain continuous contact with the road surface throughout their exposure to traction and to yieldingly clutch the road bed momentarily under traction stresses.

3. A structure of the class described comprising, in cross section, a slightly arched tread portion adapted to assume a flattened contour under load, thereby apportioning and equalizing the bearing stresses transmitted into the sub-structure throughout its breadth, a continuous annular mid rib, and counterpart resilient raised traction pads on each side thereof, in plan view constituting cruciform patterns, said pads being in spaced and staggered relation and disposed, as of the obliquity of their arms to the mid-rib, at approximately forty-five (45) degrees, whereby in driving ahead or reversing a plurality of V-shaped projections will yieldingly clutch the road, and whereby in oblique skidding there are interposed transversely of the direction of motion a plurality of resilient cleat-like projections.

4. A resilient tire, having a tread portion substantially flat in transverse section and adapted to deflect under load to conform with the road, whereby stresses are apportioned and equalized in the sub-structure; a continuous high-standing and relatively flat mid-rib in said tread adapted to partially relieve the load from the traction pads, whereby retardation to rolling is reduced; independent high-standing traction pads on each side of the mid-rib, of cruciform pattern and staggered with respect to complementary opposed pads, and having their arms angularly disposed with respect to the median plane of the tire, the surfaces of said pads lying in the plane of the road when under load whereby a plurality of them are simultaneously in yielding contact therewith, said pads having deep and substantially vertical side walls and relatively narrow cross arms, in plan view, and constructed of highly resilient material, whereby each pad is adapted to freely bend in all directions and to twist with respect to its contacting surface, thereby momentarily clinging to the road while bending without slippage, whereby traction is sustained and abrasion of the material due to slippage minimized, said pads presenting a V-shaped clutch in the direction of the circumference of the tire and obliquely disposed cleat-like projections to the direction of side slippage whereby a skidding tendency is corrected.

In testimony whereof I affix my signature.

EDISON G. HULSE.